J. G. SCHONFARBER.
HOSE CLAMP.
APPLICATION FILED MAR. 14, 1919.

1,309,780.

Patented July 15, 1919.

INVENTOR.
Jacob G. Schonfarber
Joseph A. Miller
ATTORNEY.

UNITED STATES PATENT OFFICE.

JACOB G. SCHONFARBER, OF PROVIDENCE, RHODE ISLAND.

HOSE-CLAMP.

1,309,780.  Specification of Letters Patent.  Patented July 15, 1919.

Application filed March 14, 1919. Serial No. 282,601.

*To all whom it may concern:*

Be it known that I, JACOB G. SCHONFARBER, a citizen of the United States, residing at Providence, in the county of Providence and State of Rhode Island, have invented a new and useful Improvement in Hose-Clamps, of which the following is a specification.

This invention relates to certain new and useful improvements in a hose clamp, and it consists in a split sleeve having a beveled end and an adjacent threaded part adapted to receive a nut which has its outer end contracted in the form of a beveled seat to coact with the beveled end of the split sleeve in forcing the resilient sections of the sleeve inwardly into clamping relation with the inclosed nipple or pipe section.

The invention is especially adapted for joining a flexible pipe to a nipple or tube of a burner, and it has for its primary object and aim to improve the construction whereby a tight joint and connection is readily obtained.

In the drawings—

Figure 1:
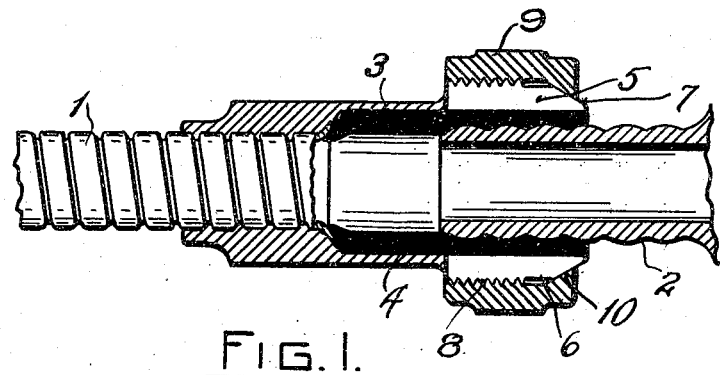
Figure 1 is a partial longitudinal section through the improved hose clamp.

Referring more in detail to the drawing, the numeral 1 designates a flexible pipe and 2 the projecting tube from a burner, heater, stove, or other device (not shown).

The improved hose clamp or pipe coupling consists of a sleeve having one end contracted about the end of the flexible pipe and its opposite end counterbored and fitted with a rubber lining or packing 4 to receive the projecting tube from the burner. The counterbored or enlarged end of the sleeve 3 is radially slitted throughout a portion of its length, as indicated at 5, to thereby form a series of radially clamping sections or jaws 6. The extreme end of this coupling sleeve is formed with an external bevel face 7 and spaced a distance therefrom, but located on the spring clamping jaws, are provided external screw threads 8.

The clamping nut 9 is formed at its outer end with a contracted or inwardly beveled seat 10. In operation, the rubber lined coupling sleeve is threaded over the end of the projecting tube 2 and the nut then screwed home during which the beveled seat 10 will engage the sleeve bevel 7 to thereby force the clamping jaws into tight gripping relation with the tube. It will be noted that the clamping action of the jaws is such that the rubber of the packing will be drawn tighter around the tube at the inner end of the coupling sleeve and thereby tend to force the rubber longitudinally inward within said sleeve for rendering the connection more efficient. The slits 5 extend merely to the base of the screw threads 8 so that the threads will not be drawn away from the threads of the nut but rather be disposed at a slight deflection or inward inclination to bind on the nut threads and thereby serve as a lock to prevent unauthorized displacement of the nut.

Figure 2:
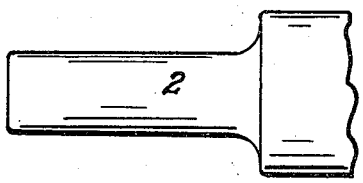
Fig. 2 is a side elevation of one form of burner tube or nipple to which the hose clamp is engageable.
Figure 3:
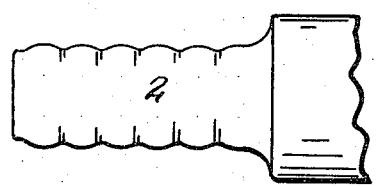
Fig. 3 is a similar view of a modified form of burner tube.
Figure 4:
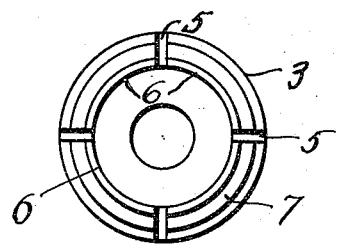
Fig. 4 is an end view of the split sleeve of the hose clamp.

The form of nipple or tube may either have a corrugated exterior, as depicted in Figs. 1 and 3, or smooth, as illustrated in Fig. 2. The clamping jaws securely clutch the nipple with such friction as to prevent withdrawal or separation of the parts. The rubber lining also extends inwardly over the end of the flexible pipe to seal the joint of the sleeve with the pipe.

Having thus described my invention, what I claim as new and desire to secure by Letters Patent is—

1. A hose clamp comprising, in combination with a flexible pipe and a projecting tube from a burner, or the like, a coupling sleeve secured to the pipe and having its opposite end counterbored and slit radially and lengthwise to define resilient clamping jaws, the free ends of the jaws being outwardly beveled and the opposite end portion of the jaws being provided with external screw threads extending to the base of the slits, a rubber lining for the counterbored end of the sleeve, and a nut engaged with the threads of the sleeve and formed with a contracted beveled seat adapted to engage the beveled ends of the jaws for forcing the latter inwardly at their outer ends, with the rubber lining into tight gripping relation with the burner tube and thereby crowd the rubber lining inwardly about the inner end of the tube.

2. A hose clamp comprising, in combination with a flexible pipe, a coupling sleeve secured over the end of the pipe, the projecting end of the sleeve being longitudinally slitted, a rubber lining interior of the sleeve and lapping the inner end of the pipe, said slitted end adapted to receive a second pipe, and means for clamping the slitted end inwardly about the second pipe.

In testimony whereof I have signed my name to this specification in the presence of two subscribing witnesses.

JACOB G. SCHONFARBER.

Witnesses:
ADA E. HAGERTY,
J. A. MILLER.

Copies of this patent may be obtained for five cents each, by addressing the "Commissioner of Patents, Washington, D. C."